United States Patent
Freling et al.

(10) Patent No.: US 8,007,899 B2
(45) Date of Patent: Aug. 30, 2011

(54) SEGMENTED ABRADABLE COATINGS AND PROCESS(ES) FOR APPLYING THE SAME

(75) Inventors: Melvin Freling, West Hartford, CT (US); Kevin W. Schlichting, Storrs, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/757,549

(22) Filed: Apr. 9, 2010

(65) Prior Publication Data

US 2010/0196663 A1    Aug. 5, 2010

Related U.S. Application Data

(63) Continuation of application No. 11/543,625, filed on Oct. 5, 2006, now abandoned.

(51) Int. Cl.
*B32B 3/10* (2006.01)
*B32B 18/00* (2006.01)
*B05D 5/00* (2006.01)
*C23C 4/10* (2006.01)

(52) U.S. Cl. ........ 428/155; 428/210; 427/257; 427/448; 416/241 R; 416/241 B

(58) Field of Classification Search .................. None
See application file for complete search history.

(56) References Cited

U.S. PATENT DOCUMENTS

| | | | |
|---|---|---|---|
| 3,528,861 A | 9/1970 | Elam et al. | |
| 3,542,530 A | 11/1970 | Talboom, Jr. et al. | |
| 3,649,225 A | 3/1972 | Simmons, Jr. | |
| 3,676,085 A | 7/1972 | Evans et al. | |
| 3,754,903 A | 8/1973 | Goward et al. | |
| 4,078,922 A | 3/1978 | Magyar et al. | |
| RE32,121 E | 4/1986 | Gupta et al. | |
| 4,585,481 A | 4/1986 | Gupta et al. | |
| 5,705,231 A | 1/1998 | Nissley et al. | |
| 5,780,171 A | 7/1998 | Nissley et al. | |
| 5,879,753 A | 3/1999 | Zajchowski et al. | |
| 5,921,751 A | 7/1999 | Freling et al. | |
| 6,102,656 A | 8/2000 | Nissley et al. | |
| 6,358,002 B1 | 3/2002 | Good et al. | |
| 6,511,762 B1 * | 1/2003 | Lee et al. | 428/697 |
| 2002/0141868 A1 | 10/2002 | Lee et al. | |
| 2003/0211354 A1 * | 11/2003 | Subramanian et al. | 428/633 |
| 2005/0170200 A1 | 8/2005 | Nagaraj et al. | |

FOREIGN PATENT DOCUMENTS

EP       0765951 A2    4/1997

(Continued)

OTHER PUBLICATIONS

EP Search Report for EP Patent Application No. 07253963.8, dated May 3, 2010.

*Primary Examiner* — Timothy M Speer
*Assistant Examiner* — Vera Katz
(74) *Attorney, Agent, or Firm* — Bachman & LaPointe, P.C.

(57) ABSTRACT

A segmented abradable ceramic coating comprises a bond coat layer, at least one segmented 7 weight percent yttria-stabilized zirconia layer disposed upon said bond coat layer, and at least one 12 weight percent yttria-stabilized zirconia layer disposed upon said at least one segmented 7 weight percent yttria-stabilized zirconia layer.

25 Claims, 2 Drawing Sheets

FOREIGN PATENT DOCUMENTS

| | | |
|---|---|---|
| EP | 0926254 A2 | 6/1999 |
| JP | 58087273 A | 5/1983 |
| JP | 4-503833 A | 7/1992 |
| JP | 11-229108 A | 8/1999 |
| JP | 11-229109 A | 8/1999 |
| JP | 2001-348655 A | 12/2001 |
| JP | 2002-69607 A | 3/2002 |
| JP | 2005-97727 A | 4/2005 |
| JP | 2006-503722 A | 2/2006 |

* cited by examiner

SEGMENTED ABRADABLE COATINGS AND PROCESS(ES) FOR APPLYING THE SAME

CROSS-REFERENCE TO RELATED APPLICATION

This is a continuation application of Ser. No. 11/543,625, filed Oct. 5, 2006, and entitled Segmented Abradable Coatings and Process(es) for Applying the Same, the disclosure of which is incorporated by reference herein in its entirety as if set forth at length.

FIELD OF THE INVENTION

The invention relates to coatings and, more particularly, relates to segmented abradable coatings and their coated articles.

BACKGROUND OF THE INVENTION

Modern gas turbine engines, particularly those used in aircraft, operate at high rotational speeds and high temperatures for increased performance and efficiency. The turbine of a modern gas turbine engine is typically of an axial flow design and includes a plurality of axial flow stages. Each axial flow stage comprises a plurality of blades mounted radially at the periphery of a disk which is secured to a shaft. A plurality of duct segments surround the stages to limit the leakage of gas flow around the tips of the blades. These duct segments are located on the inner surface of a static housing or casing. The incorporation of the duct segments improves thermal efficiency because more work may be extracted from gas flowing through the stages as opposed to leaking around the blade tips.

Although the duct segments limit the leakage of gas flow around the blade tips, they do not completely eliminate the leakage. It has been found that even minor amounts of gas flow around the blade tips detrimentally affect turbine efficiency. Thus, gas turbine engine designers proceed to great lengths to devise effective sealing structures. These structures generally include a coated duct segment in combination with a blade tip coating which renders the tips resistant to wear. In operation, the tips provide sealing by cutting into the coating on the duct segment. However, any structure within the gas turbine engine that develops hot spots includes a coating to resist wear and effectively seal the structure.

Unfortunately current coatings, which are typically ceramic, suffer from excessive material loss as a result of erosion or spalling. In general, erosion is the wearing away of coating material due to factors such as abrasion and corrosion. Erosion often results from particle impingement during engine operation. Spalling is typically caused by delamination cracking at the ceramic-metal interface resulting from thermal stress and the aggressive thermal environment. Spalling is essentially gradual coating loss consisting of many small coherent volumes of coating material. Ceramic coating loss increases blade tip clearance and thus is detrimental to turbine efficiency, as well as detrimental to the blades themselves. For example, the blades may become damaged due to the increased temperature at which the engine must then operate to make up for lost thrust.

Accordingly, there exists a need for a coating which is abradable as well as erosion and spalling resistant. This coating is necessary for a sealing system having superior abradability and erosion resistance.

SUMMARY OF THE INVENTION

In accordance with embodiments of the present invention, a process for applying a segmented ceramic coating on an article broadly comprises (1) depositing an amount of bond coat material sufficient to form a bond coat layer upon at least one surface of an article; (2) depositing an amount of 7 weight percent yttria-stabilized zirconia sufficient to form a 7 weight percent yttria-stabilized zirconia layer upon the bond coat layer; (3) heating said article to expand the 7 weight percent yttria-stabilized zirconia layer and promote vertical crack propagation therein to form a segmented 7 weight percent yttria-stabilized zirconia layer; (4) depositing an amount of 12 weight percent yttria-stabilized zirconia sufficient to form a 12 weight percent yttria-stabilized zirconia layer upon the segmented 7 weight percent yttria-stabilized zirconia layer to form a coated article; and (5) heating treating the coated article.

In accordance with other embodiments of the present invention, a segmented abradable ceramic coating broadly comprises a bond coat layer; at least one segmented 7 weight percent yttria-stabilized zirconia layer disposed upon said bond coat layer; and at least one 12 weight percent yttria-stabilized zirconia layer disposed upon said at least one segmented 7 weight percent yttria-stabilized zirconia layer.

In accordance with yet other embodiments of the present invention, a coated article broadly comprises a substrate having a bond coat layer disposed upon at least one surface of the substrate; at least one segmented 7 weight percent yttria-stabilized zirconia layer disposed upon the bond coat layer; and at least one 12 weight percent yttria-stabilized zirconia layer disposed upon the at least one segmented 7 weight percent yttria-stabilized zirconia layer.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
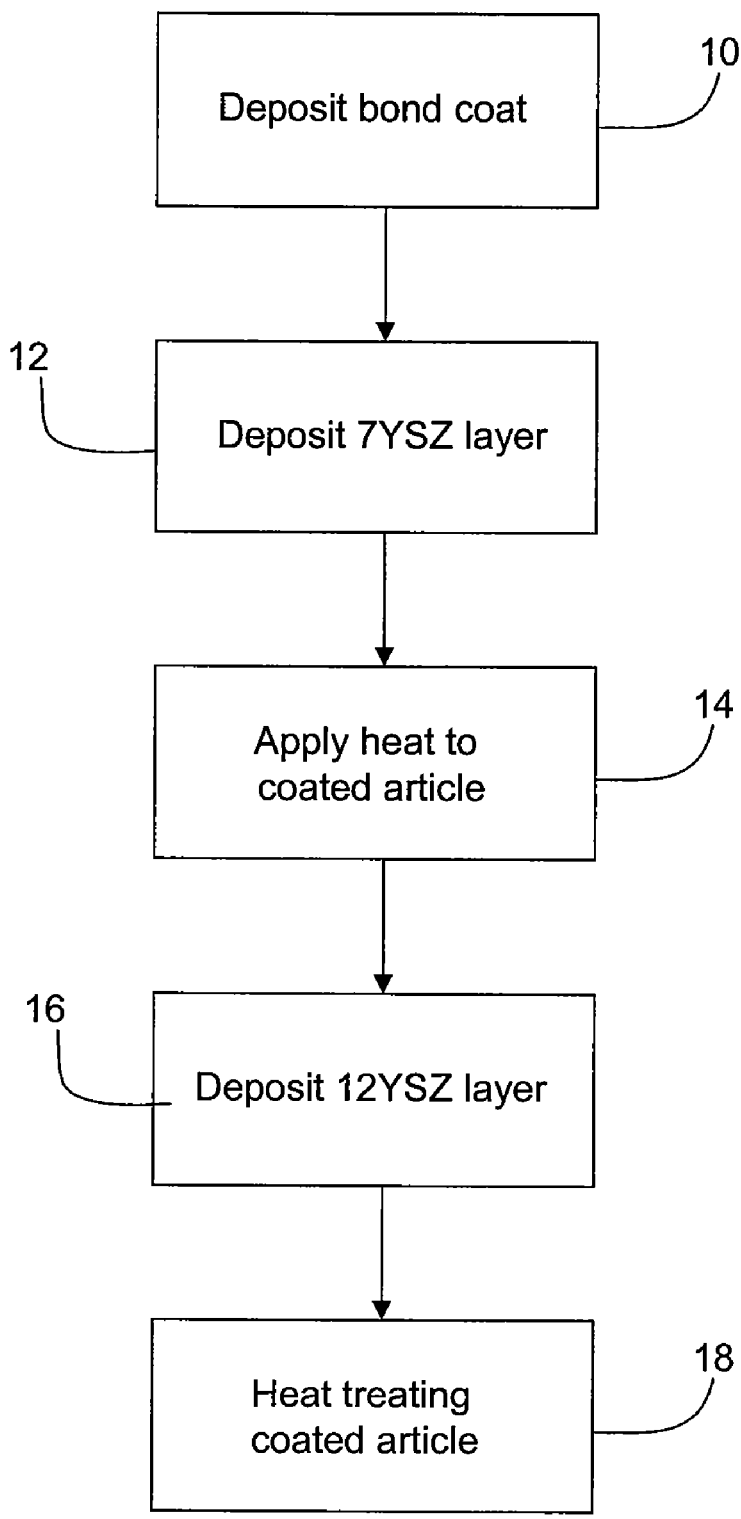
FIG. 1 is a process flowchart of one embodiment of the present invention.

FIG. 1 shows a flowchart of a process for applying a segmented ceramic coating on an article. An amount of bond coat material sufficient to form a bond coat layer upon a surface of an article may be deposited into a heat stream generated by a heat source at step 10.

The bond coat material may comprise a McrAlY material. MCrAlY refers to known metal coating systems in which M denotes nickel, cobalt, iron, platinum or mixtures thereof; Cr denotes chromium; Al denotes aluminum; and Y denotes yttrium. MCrAlY materials are often known as overlay coatings because they are applied in a predetermined composition and do not interact significantly with the substrate during the deposition process. For some non-limiting examples of MCrAlY materials see U.S. Pat. No. 3,528,861 which describes a FeCrAlY coating as does U.S. Pat. No. 3,542,530. In addition, U.S. Pat. No. 3,649,225 describes a composite coating in which a layer of chromium is applied to a substrate prior to the deposition of a MCrAlY coating. U.S. Pat. No. 3,676,085 describes a CoCrAlY overlay coating while U.S. Pat. No. 3,754,903 describes a NiCoCrAlY overlay coating having particularly high ductility. U.S. Pat. No. 4,078,922 describes a cobalt base structural alloy which derives improved oxidation resistance by virtue of the presence of a combination of hafnium and yttrium. A preferred MCrAlY bond coat composition is described in U.S. Pat. No. Re. 32,121, which is assigned to the present Assignee and incorporated herein by reference, as having a weight percent compositional range of 5-40 Cr, 8-35 Al, 0.1-2.0 Y, 0.1-7 Si, 0.1-2.0 Hf, balance selected from the group consisting of Ni, Co and mixtures thereof. See also U.S. Pat. No. 4,585,481, which is also assigned to the present Assignee and incorporated herein by reference.

The bond coat material may also comprise Al, PtAl and the like, that are often known in the art as diffusion coatings. In addition, the bond coat material may also comprise Al, PtAl, MCrAlY as described above, and the like, that are often known in the art as cathodic arc coatings.

These bond coat materials may be applied by any method capable of producing a dense, uniform, adherent coating of the desired composition, such as, but not limited to, an overlay bond coat, diffusion bond coat, cathodic arc bond coat, etc. Such techniques may include, but are not limited to, diffusion processes (e.g., inward, outward, etc.), low pressure plasma-spray, air plasma-spray, sputtering, cathodic arc, electron beam physical vapor deposition, high velocity plasma spray techniques (e.g., HVOF, HVAF), combustion processes, wire spray techniques, laser beam cladding, electron beam cladding, etc. For example, suitable plasma spray techniques are described in U.S. Pat. No. 6,102,656 to Nissley et al., and U.S. Pat. No. 5,879,753 to Zajchowski et al., which are both incorporated herein by reference in their entirety.

The particle size for the bond coat 30 may be of any suitable size, and in embodiments may be between about 2 microns (0.002 mm) and about 125 microns (0.125 mm), more preferably between about 6 microns (0.006 mm) and about 90 microns (0.0090 mm), and even more preferably between about 10 microns (0.010 mm) and about 60 microns (0.060 mm), with a mean particle size of about 25 microns (0.025 mm). The bond coat 30 may be applied to any suitable thickness, and in embodiments may be about 1 mil (0.0254 mm) to about 25 mils (0.635 mm) thick, more preferably about 2 mils (0.0508 mm) to about 15 mils (0.381 mm), and even more preferably about 5 mils (0.127 mm) to about 10 mils (0.254 mm).

After applying the bond coat layer, an amount of 7 weight percent yttria-stabilized zirconia sufficient to form a 7 weight percent yttria-stabilized zirconia layer ("7YSZ layer") may be deposited upon the bond coat layer at step 12. The 7YSZ layer may be applied using any one of a number of coating techniques known to one of ordinary skill in the art such as, but not limited to, air plasma-spray, high velocity plasma spray techniques (e.g., HVOF, HVAF), sol gel, UV curable resins, and the like. For example, suitable plasma spray techniques are described in U.S. Pat. No. 6,102,656 to Nissley et al., and U.S. Pat. No. 5,879,753 to Zajchowski et al. Generally, the 7YSZ layer may be applied to a thickness of about 1 mil (0.0254 mm) to about 60 mils (1.524 mm), more preferably about 2 mils (0.0508 mm) to about 30 mils (0.762 mm), and even more preferably about 2 mils (0.0508 mm) to about 15 mils (0.381 mm). Typically, the thermal conductivity of 7YSZ may be about 5 BTU in/hr ft$^2$ ° F. to about 12 BTU in/hr ft$^2$ ° F., more preferably about 6 BTU in/hr ft$^2$ ° F. to about 10 BTU in/hr ft$^2$ ° F., and even more preferably about 6 BTU in/hr ft$^2$ ° F. to 8 BTU in/hr ft$^2$ ° F.

The particle size of the 7YSZ powder may range from about 2 microns (0.002 mm) to about 175 microns (0.002 mm), more preferably about 6 microns (0.006 mm) to about 125 microns (0.125 mm), and even more preferably about 11 microns (0.011 mm) to about 125 microns (0.125 mm), with a particle size of about 50 microns (0.050 mm) in mean diameter. The particles may be produced from a spray dried and sintered process which results in spherical and hollow powders, as opposed to fused and crushed powders which are angular and solid. Generally, the initial step of the spray dried and sintered process includes mixing raw zirconia and yttria to a desired weight percent ratio. This mixture may then be combined with water (and conventional binders) to produce a slip. The slip may then be fed into a spray dryer which partially dries the slip by spraying the material into a heated chamber, thereby producing spherical and hollow powders. Then the material may be heated at the sintering temperature in a furnace for typically between about 4 hours and about 8 hours. This sintering temperature therein may usually be about 60% to about 70% of the theoretical melting point of zirconium oxide.

In the alternative, a spray dried and plasma densified process may be used, although this process may be more expensive than the above described process. Generally, the initial step of this process also includes mixing raw zirconia and yttria to a desired weight percent ratio. This mixture may then also be combined with water (and conventional binders) to produce a slip. The slip may then be fed into a spray dryer which partially dries the slip by spraying the material into a heated chamber, thereby producing spherical and hollow powder. Following the spray drying step, the powder may then be fed through a plasma spray gun where the yttria and zirconia melt to produce a homogeneous composition.

The spherical and hollow morphology of the powder prior to deposition provides superior abradability in the final coating system. Alternatively, if solid particles are present in the powder prior to deposition, more heat is required to melt the powder, which creates a dense coating which may not be very abradable. In addition, the deposition efficiency for angular and solid particles is less relative to spherical and hollow particles, which is extremely important for manufacturing cost concerns.

The 7YSZ layer is beneficial to the success of the segmented abradable coating system because it provides a tough ceramic structure, starts segmentation of the deposited material into vertical microcracks, provides erosion protection and provides a thermal barrier benefit. Also, the 7YSZ layer bonds to the bondcoat layer.

The 7YSZ layer is preferably plasma sprayed in air. It may be desirable to heat the article at a step 14 and monitor the temperature at less than about 600° F. (316° C.) to help segmentation of the material into vertical microcracks. This heating may be accomplished by application of heat to the back side of the article during material deposition. The above described heating parameters apply to depositing the 7YSZ layer, as well as to the other subsequently applied layers. Preferably, however, the article is not heated except incidentally during spraying.

The processing parameters are controlled to produce vertical crack propagation (approximately perpendicular to the bond coat surface) and are specific to variables such as gun type and fixture geometry. In general, we have found that a close gun to part spray distance coupled with relatively high power deposition results in desirable vertical segmentation of between about 4 and about 8 microcracks per inch. The parameters described herein were specifically tailored for use with a Sulzer Metco, Inc. 3 MB air plasma spray gun and a cylindrical fixture having a 30 inch (0.76 m) diameter. One of ordinary skill in the art would appreciate that the parameters may vary with the use of a different spray gun and/or fixture. Accordingly, the parameters set forth herein may be used as a guide for selecting other suitable parameters for different operating conditions.

Specifically, during the spray deposition of the 7YSZ layer, the cylindrical fixture may rotate at a speed between about 5 rpm and about 25 rpm, and preferably at about 12 rpm. The plasma spray gun may be located in the interior or exterior of the hollow cylindrical fixture dependent upon the type of parts being coated. The gun to part angle during individual part coating may be between about 80 degrees and about 100 degrees, and preferably about 90 degrees. The gun to part distance may be varied in increments from about a nominal 2 inches (0.05 m) (starting distance) to about a nominal 5 inches (0.13 m) (end distance), and preferably between about 2.75 inches (0.07 m) (starting distance) and about 3.25 inches (0.083 m) (end distance) during production of layer 18. This close gun distance may be necessary for satisfactory vertical segmentation. Gun traverse speed across each part during deposition may be between about 1 in/min (0.03 m/min) and about 5 in/min (0.13 m/min), preferably about 4.4 in/min (0.11 m/min).

Powder feed rate may be between about 15 grams/min and about 50 grams/min, and preferably about 35 grams/min. Carrier gas flow, such as nitrogen, may be used to maintain the powder under pressure and facilitate powder feed. The flow rate may be between about 5 scfh (standard cubic feet/hour) (0.14 scmh (standard cubic meters/hour) and about 20 scfh (0.57 scmh), preferably about 11 scfh (0.31 scmh). Standard conditions are herein defined as about room temperature (25° C.) and about one atmosphere of pressure (101 kPa). Primary gas flow, such as nitrogen gas, in the gun may be between about 80 scfh (2.27 scmh) and about 120 scfh (3.40 scmh), and preferably about 99 scfh (2.80 scmh). Similarly, secondary gas flow, such as hydrogen, in the gun may be between about 5 scfh (0.14 scmh) and about 30 scfh (0.85 scmh), and preferably about 18 scth (0.51 scmh). Gun voltage may be between about 60 volts and about 80 volts, and preferably about 75 volts. Similarly, gun amperage may be between about 700 amps and about 900 amps, and preferably about 736 amps. We have found the above described parameters to be optimum for the deposition process using the Sulzer Metco 3 MB plasma spray gun, but one skilled in the art would appreciate that the parameters are dependent on variables, including but not limited to, powder type, powder size and especially type of gun.

After applying the 7YSZ layer, an amount of 12 weight percent yttria-stabilized zirconia sufficient to form a 12 weight percent yttria-stabilized zirconia layer ("12YSZ layer") may be deposited upon the bond coat layer at step 16. The 12YSZ ceramic powder may be prepared and the resultant layer may be applied using any one of a number of coating techniques known to one of ordinary skill in the art such as those disclosed in U.S. Pat. No. 6,102,656 to Nissley et al., and U.S. Pat. No. 5,879,753 to Zajchowski et al. Preferably, the 12YSZ ceramic powder may be prepared and the resultant layer may be applied using the same deposition parameters as the 7YSZ layer described herein. Generally, the 12YSZ layer may be applied to a thickness of about 1 mil (0.0254 mm) to about 60 mils (1.524 mm), more preferably about 2 mils (0.0508 mm) to about 30 mils (0.762 mm), and even more preferably about 2 mils (0.0508 mm) to about 15 mils (0.381 mm). Typically, the thermal conductivity of 12YSZ may be about 3 BTU in/hr ft$^2$ ° F. to about 10 BTU in/hr ft$^2$ ° F., more preferably about 4 BTU in/hr ft$^2$ ° F. to about 8 BTU in/hr ft$^2$ ° F., and even more preferably about 4 BTU in/hr ft$^2$ ° F. to about 6 BTU in/hr ft$^2$ ° F. The particle size of the 12YSZ powder may range from about 2 microns (0.002 mm) to about 175 microns (0.002 mm), more preferably about 6 microns (0.006 mm) to about 125 microns (0.125 mm), and even more preferably about 11 microns (0.011 mm) to about 125 microns (0.125 mm), with a particle size of about 50 microns (0.050 mm) in mean diameter.

After applying the 12YSZ layer, the resultant coated article may be post heat treated for stress relief at step 18. Specifically, the coated article may be heat treated at a temperature of about 1950° F. (1066° C.) to about 2000° F. (1093° C.) for about 4 hours and then force cooled to about 1100° F. (593° C.) in about 22 minutes or less. The coated article is then force cooled to about 1000° F. (538° C.) in about 7 minutes or less and again force cooled to below 300° F. (149° C.).

Figure 2A:
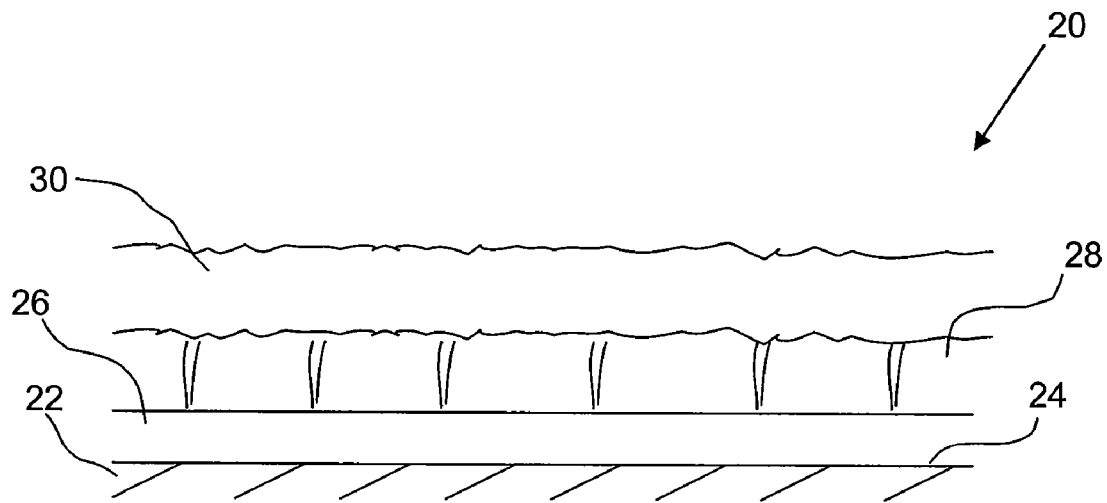
FIG. 2A is a representation of an article coated with a segmented, abradable ceramic coating of the present invention.
Figure 2B:
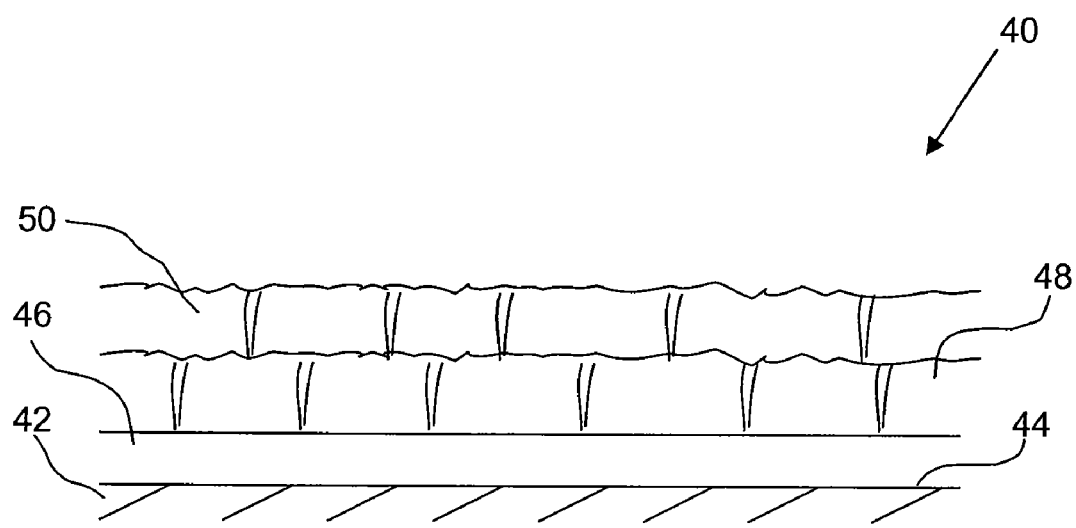
FIG. 2B is a representation of another article coated with another segmented, abradable ceramic coating of the present invention.

Representations of the resultant coated articles are shown in FIGS. 2A and 2B. In one aspect of the present invention, a coated article 20 may comprise an article 22 having at least one surface 24. A bond coat layer 26 may be disposed upon the surface 24. A segmented 7YSZ layer 28 may be disposed upon the bond coat layer 26. A 12YSZ layer 30 may be disposed upon the segmented 7YSZ layer 28. In another aspect of the present invention, a coated article 40 may comprise an article 42 having at least one surface 44. A bond coat layer 46 may be disposed upon the surface 44. A segmented 7YSZ layer 48 may be disposed upon the bond coat layer 46. A segmented 12YSZ layer 50 may be disposed upon the segmented 7YSZ layer 48.

In an effort to overcome the deleterious effects of hot spots on gas turbine engine components, the duality of mechanical properties exhibited by the segmented abradable coating(s) of the present invention provides improved toughness, improved insulative properties, and overall lower thermal conductivity over segmented abradable coatings of the prior art. The addition of 7 weight % yttrium oxide to zirconium oxide forms a tetragonal crystal structure, referred to as t prime, and is known as partially stabilized zirconia. This partially stabilized zirconia composition is stable at high temperatures and is unique in that it does not transform into the more thermodynamically stable crystal structures of monoclinic and cubic upon cooling. This tetragonal crystal structure has been shown to have improved toughness and spallation resistance over the fully stabilized composition. Fracture toughness for partially stabilized zirconia can range from 3-15 MPa·m$^{1/2}$. When additions of yttrium oxide reach 10 weight % or greater, the crystal structure becomes cubic and is stable at both high and low temperatures. This is known as a fully stabilized zirconium oxide composition. By creating a fully stabilized structure the material is not susceptible to the deleterious phase transformations and has a lower thermal conductivity due to the added stabilizer; however fracture toughness is lower than that in partially stablilized zirconia. Fracture toughness for fully stabilized zirconia ranges from 3-3.6 MPa·m$^{1/2}$. As a result, fully stabilized zirconia does not have good spallation resistance when subjected to thermal cycling. Therefore in combining the two coatings in the present invention, the 7YSZ layer provides the desired toughness and durability, while the 12YSZ layer provides the desired crystalline structure exhibiting the low thermal conductivity values and insulative properties.

One or more embodiments of the present invention have been described. Nevertheless, it will be understood that various modifications may be made without departing from the spirit and scope of the invention. Accordingly, other embodiments are within the scope of the following claims.

What is claimed is:

1. A segmented abradable ceramic coating, comprising:
    a bond coat layer;
    at least one segmented 7YSZ layer disposed upon said bond coat layer; and
    at least one 12YSZ layer disposed upon said at least one segmented 7YSZ layer.

2. The coating of claim 1, wherein said at least one 12YSZ layer is at least one segmented 12YSZ layer.

3. The coating of claim 1, further comprising a thermally grown oxide layer disposed between said bond coat layer and said at least one 7YSZ layer.

4. The coating of claim 1, wherein said at least one 7YSZ layer has a thermal conductivity value of about 5 BTU in./hr. ft$^2$ ° F. to about 12 BTU in./hr. ft$^2$ ° F.

5. The coating of claim 1, wherein said at least one 12YSZ layer has a thermal conductivity value of about 3 BTU in./hr. ft$^2$ ° F. to about 10 BTU in./hr. ft$^2$ ° F.

6. A process for applying the segmented abradable ceramic coating of claim 1 on an article, the process comprising:
    (1) depositing an amount of bond coat material sufficient to form said bond coat layer upon at least one surface of the article;
    (2) depositing an amount of 7YSZ sufficient to form a layer upon said bond coat layer;
    (3) heating said article to expand said 7YSZ layer and promote vertical crack propagation therein to form said segmented 7YSZ layer;
    (4) depositing an amount of 12YSZ sufficient to form said 12YSZ layer upon said segmented 7YSZ layer to form a coated article; and
    (5) heating treating said coated article.

7. The process of claim 6, prior to completing step (5) further comprising the step of heating said article to expand said 12YSZ layer and promote vertical crack propagation therein to form a segmented 12YSZ layer.

8. The process of claim 6, wherein depositing said amount of bond coat material comprises thermal spraying said amount of bond coat material.

9. The process of claim 6, wherein depositing said amount of 7YSZ comprises thermal spraying said amount of 7YSZ.

10. The process of claim 6, wherein depositing said amount of 12YSZ comprises thermal spraying said amount of 12YSZ.

11. The process of claim 6, wherein steps (2) and (3) are repeated at least one time.

12. The process of claim 6, further comprising positioning a thermal spray apparatus about 3 inches to about 4 inches from said at least one surface.

13. The process of claim 6, wherein said heating further comprises backheating said at least one surface of said article.

14. The process of claim 6, further comprising the step of forming a layer of thermally grown oxide upon said bond coat layer prior to performing step (2).

15. The process of claim 6, further comprising the step of cooling said coated article after heat treating said coated article.

16. The process of claim 6, wherein depositing an amount of 7YSZ comprises depositing a 7YSZ having a particle size of about 2 microns (0.002 mm) to about 175 microns (0.175 mm).

17. The process of claim 6, wherein said depositing said amount of 12YSZ comprises depositing a 12YSZ having a particle size of about 2 microns (0.002 mm) to about 175 microns (0.175 mm).

18. A coated article, comprising:
    a substrate having at least one surface;
    a bond coat layer disposed upon said at least one surface;
    at least one segmented 7YSZ layer disposed upon said bond coat layer; and
    at least one 12YSZ layer disposed upon said at least one segmented 7YSZ layer.

19. The coated article of claim 18, wherein said at least one 12YSZ layer is at least one segmented 12YSZ layer.

20. The coated article of claim 18, further comprising a thermally grown oxide layer disposed between said bond coat layer and said at least one 7YSZ layer.

21. The coated article of claim 18, wherein said at least one 7YSZ layer has a thermal conductivity value of about 5 BTU in./hr. ft$^2$ ° F. to about 12 BTU in./hr. ft$^2$ ° F.

22. The coated article of claim 18, wherein said at least one 12YSZ layer has a thermal conductivity value of about 3 BTU in./hr. ft$^2$ ° F. to about 10 BTU in./hr. ft$^2$ ° F.

23. The coated article of claim 18, wherein said at least one 7YSZ layer has a thickness of about 1 mil (0.0254 mm) to about 60 mils (1.524 mm).

24. The coated article of claim 18, wherein said at least one 12YSZ layer has a thickness of about 1 mil (0.0254 mm) to about 60 mils (1.524 mm).

25. The coated article of claim 18 consisting essentially of said substrate, said bond coat layer, one said segmented 7YSZ layer, and one said 12YSZ layer.

* * * * *